(12) United States Patent
Pandey

(10) Patent No.: US 8,726,072 B1
(45) Date of Patent: May 13, 2014

(54) SYSTEM AND METHOD FOR IMPROVING CLUSTER PERFORMANCE USING AN OPERATION THREAD FOR PASSIVE NODES

(75) Inventor: Manu Pandey, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 155 days.

(21) Appl. No.: 13/344,248

(22) Filed: Jan. 5, 2012

Related U.S. Application Data

(62) Division of application No. 11/729,531, filed on Mar. 29, 2007, now Pat. No. 8,112,593.

(51) Int. Cl.
*G06F 11/20* (2006.01)
(52) U.S. Cl.
USPC .............................. 714/13; 714/10; 709/224
(58) Field of Classification Search
USPC ................ 714/4.12, 5.1, 5.11, 10, 12, 13, 43; 709/252, 224, 226
See application file for complete search history.

(56) References Cited

U.S. PATENT DOCUMENTS

| | | | |
|---|---|---|---|
| 5,640,584 A * | 6/1997 | Kandasamy et al. ........... 712/30 | |
| 5,933,412 A | 8/1999 | Choudhury et al. | |
| 6,145,094 A * | 11/2000 | Shirriff et al. ................... 714/11 | |
| 6,915,447 B2 * | 7/2005 | Kleiman ....................... 714/6.12 | |
| 6,944,662 B2 * | 9/2005 | Devine et al. .................. 709/225 | |
| 7,024,580 B2 | 4/2006 | Guimbellot et al. | |
| 7,039,827 B2 * | 5/2006 | Meyer et al. .................. 714/4.11 | |
| 7,533,295 B2 * | 5/2009 | Gunda et al. ..................... 714/10 | |
| 2002/0199000 A1 * | 12/2002 | Banerjee ........................ 709/227 | |
| 2003/0005350 A1 * | 1/2003 | Koning et al. ..................... 714/4 | |
| 2003/0014480 A1 * | 1/2003 | Pullara et al. .................. 709/203 | |
| 2003/0182264 A1 | 9/2003 | Wilding et al. | |
| 2004/0015668 A1 | 1/2004 | McBrearty et al. | |
| 2004/0153841 A1 | 8/2004 | Beck | |
| 2004/0243650 A1 | 12/2004 | McCrory et al. | |
| 2005/0138174 A1 | 6/2005 | Groves et al. | |
| 2007/0136389 A1 * | 6/2007 | Bergant et al. ................ 707/201 | |
| 2009/0006520 A1 * | 1/2009 | Abib et al. .................... 709/201 | |

* cited by examiner

*Primary Examiner* — Joseph Schell
(74) *Attorney, Agent, or Firm* — Klein, O'Neill & Singh, LLP

(57) ABSTRACT

A system for providing improved cluster operation performance comprises a storage system and a cluster system communicatively coupled to the storage system. The cluster system comprises an active node and a plurality of passive nodes. The active node comprises a storage system interface engine and at least one initiator engine and each of the plurality of passive nodes comprises a storage system interface engine and at least one initiator engine. The storage system interface engine of the active node is configured to coordinate communication between the cluster system and the storage system, and simultaneously communicate an operation request from each of the plurality of passive nodes of the cluster system to the storage system.

20 Claims, 8 Drawing Sheets

SYSTEM AND METHOD FOR IMPROVING CLUSTER PERFORMANCE USING AN OPERATION THREAD FOR PASSIVE NODES

CROSS-REFERENCE TO RELATED PATENT APPLICATIONS

This application is a Divisional of U.S. application Ser. No. 11/729,531, filed Mar. 29, 2007, now allowed. Said U.S. application Ser. No. 11/729,531 is hereby incorporated by reference in its entirety.

FIELD OF THE INVENTION

Embodiments of the present invention relate generally to the field of data management and more particularly to a system and method for improving operation performance in cluster systems.

BACKGROUND OF THE INVENTION

A server cluster is a group of independent servers running a server system and working together as a single system to provide high availability of services for clients. When a failure occurs on one node in a cluster, resources are redirected and the workload redistributed to another node in the cluster. Typical uses for server clusters include file servers, print servers, database servers and messaging servers.

The servers comprising a cluster are often referred to as cluster nodes. Cluster nodes may be active nodes or passive nodes. An active node may refer to a host that is actively running the system. The active node is also referred to as the active cluster, primary server or active server. A passive node may be an available network node that "listens" for transmissions but is not actively involved in passing them along the network; typical of a node on a bus network.

Certain operations performed on active and passive nodes of a server cluster often require the operation to be performed on the active node, and then on the passive nodes of the cluster. Performance of an operation, such as an operation to connect or disconnect a virtual disk, may be necessary for processes such as cluster failover, storage resource provisioning and the like. Typically, an operation performed on multiple passive nodes in a cluster is required to be performed in sequence on each individual passive node. For instance, an application such as a file system manager may initiate the operation on a first passive node of the cluster and, after the file system manager has verified that the operation has either successfully or unsuccessfully performed on the first passive node, the operation may be performed on a subsequent passive node. Thus, the time to perform an operation is the sum of the operation performance time of the active node and the operation performance time of each passive node in the cluster. Referring to FIG. 1, a flow diagram of a prior art method 100 for initiating a connect or disconnect operation on the nodes of a cluster is shown. An active node may require T seconds to perform a requested connect or disconnect operation 102. The time required to connect or disconnect on a subsequent passive node may be T1 seconds 104 and the time required to connect or disconnect on a passive node following the first passive node may be T1 seconds 106. The third passive node and the fourth passive node may also require T1 seconds to connect or disconnect 108-110. Therefore, the total time t taken to complete a connect or disconnect operation on the cluster may be represented as:

$$t = T + (T1 * n)$$

112 where n is the number of passive nodes in the cluster. From the equation, it is evident that in prior art connect and disconnect operations, the total time t, increases with the addition of passive nodes to the cluster. Disadvantageously, this connect or disconnect initiation protocol is time inefficient, and becomes increasingly time inefficient as additional passive nodes join the cluster.

Consequently, it would be advantageous to provide a system and method for improving operation performance in cluster systems by providing simultaneous operation initiation for all passive nodes in a cluster.

SUMMARY OF THE INVENTION

Accordingly, the various embodiments of the present invention provide a system and method for enhancing cluster performance. In accordance with a first aspect of the present invention, a system for enhancing cluster performance is provided. Such a system may comprise a cluster system and a storage system coupled to the cluster system via a network. The cluster system may be a collection of servers, which may be referred to as nodes. Nodes may be active nodes or passive nodes with respect to a resource group and represent individual servers, physical or virtual, of the cluster system. A resource group is a collection of resources (such as a volume, a particular network address, or an application such as a web server). A passive node may be a cluster node that "listens" for transmissions but is not actively involved in passing them along a network such as a standby server. Active node refers to the node that is actively running the system and managing the resource group and may also be referred as a primary server or an active server. Advantageously, the present invention coordinates communication between the cluster system and the storage system, and simultaneously communicates an operation request from each of the plurality of passive nodes of the cluster system to the storage system. Simultaneous execution of operation requests on passive nodes allows the cluster system to perform an operation more rapidly than if the operations are performed in series on each passive node. The time savings for operation execution increases as the number of nodes in the cluster system increases.

Nodes may each comprise a storage system interface engine configured to receive an operation request and communicate the operation request to a node initiator engine at the node. In one embodiment, the node initiator engine of an active node is suitable for communicating the operation request to a communication engine of the storage system. The communication engine is configured to execute the operation request and communicate the status of the operation execution to the initiator engine of the active node. Storage system interface engine of the active node is also configured to communicate the operation request simultaneously to the storage system interface engines of each of the plurality of passive nodes. Passive node initiator engines are configured to simultaneously communicate the operation request to the communication engine of the storage system. Communication engine may then simultaneously perform the operation request for each of the plurality of passive nodes.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Embodiments of the present invention provide a mechanism by which an active cluster node storage system interface engine is suitable for performing an operation on the active node of the cluster. Storage system interface engine may generate a thread comprising a set of operation performance instructions on a first node. Storage system interface engine may subsequently perform the operation on the remaining nodes in parallel following the execution of the operation on the first node. To perform the operation on each of the plurality of passive cluster nodes, storage system interface engine may generate an operation sub-thread for each of the plurality of passive cluster nodes. Sub-threads may comprise the set of operation performance instructions executed on the passive node. Storage system interface engine may execute the sub-threads simultaneously on each of the plurality of passive nodes in the cluster. Storage system interface engine may also be suitable for presenting the result of the operation execution to a client application.

System Architecture

Figure 1:
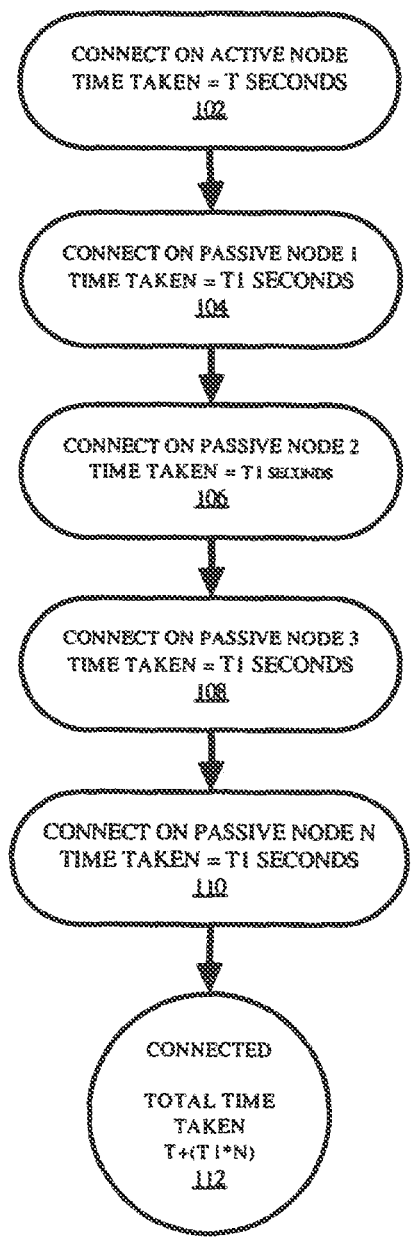
FIG. 1, already described, is a diagram illustrating node connect or disconnect operation performance in the prior art model.
Figure 2:
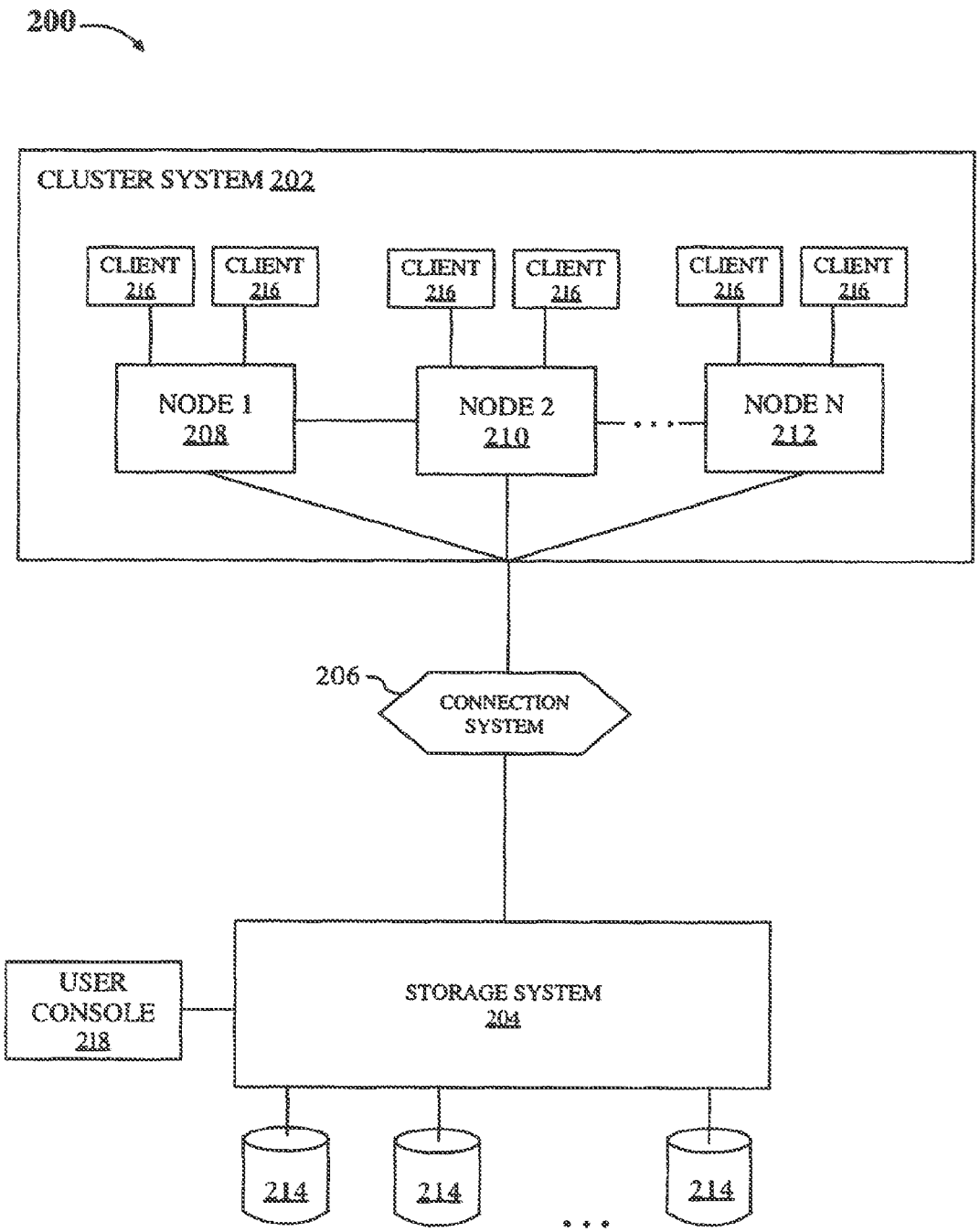
FIG. 2 is a diagram of network environment that includes a storage system and a cluster system capable of implementing the cluster system improvement according to an embodiment of the present invention.

In accordance with an embodiment of the present invention, FIG. 2 illustrates a diagram of network environment 200 capable of implementing the cluster system improvement according to an embodiment of the present invention. System 200 may comprise a cluster system 202 and a storage system 204 coupled to the cluster system 202 via a connection system 206. Each node 208, 210, 212 in the cluster system 202 is connected to multiple clients 216.

Cluster System 202

The cluster system 202, which may be referred to as a node cluster or cluster, may be a server system, further comprising a plurality of nodes 208, 210, 212 representing individual servers, physical or virtual, of the cluster system 202. In one embodiment, cluster system 202 may be a high-availability (HA) parallel or distributed cluster system comprising a collection of interconnected computer systems or nodes utilized as a single, unified computing unit. Physical or logical servers are generally referred to as cluster nodes, and there may be two or more cluster nodes in a cluster. As will be described, nodes 208, 210, 212 may each comprise one or more cluster disk arrays, or cluster storage and a connection device such as a bus. The connection device may provide interconnectivity for the storage system and the nodes of the cluster.

A typical cluster system 202 implemented with a system 200 in accordance with an exemplary embodiment of the present invention may comprise at least 3 nodes. However, system 200 may be suitable for a cluster environment comprising any number of nodes, including a multi-geographic node cluster comprising any number of nodes, as may be desired. It is contemplated that cluster nodes in the cluster may be located in different physical systems. Advantageously, the improvement gain achieved by the system 200 may increase exponentially as nodes and sub-clusters are added to a cluster 202.

Each node 208, 210, 212 may be a computer that handles requests for data, electronic mail, file transfers, and other network services from other computers, i.e., clients 216. As will be described in greater detail herein, nodes 208, 210, 212 may execute Microsoft™ Exchange Server and Microsoft™ SQL Server, both products provided by Microsoft Corp., of Redmond, Wash. Microsoft Exchange Server is a messaging and collaboration software system that provides support for electronic mail (e-mail) to various clients (such as clients 216) connected to nodes 208, 210, 212. Microsoft SQL Server is a relational database management system. A person of ordinary skill in the art would understand that although the present invention is described in the context of Microsoft Exchange Server and Microsoft SQL Server for illustrative purposes only, nodes 208, 210, 212 can execute any other application. Nodes 208, 210, 212 can be connected to clients 216 over a connection system such as a local area network (LAN), a wide area network (WAN), a virtual private network (VPN), a wireless network, or a like network utilizing communication links over the internet, for example, or a combination of LAN, WAN, and VPN implementations may be established. For the purposes of this description, the term "connection system" should be taken broadly to include any acceptable network architecture.

Each node 208, 210, 212 utilizes services of storage system 204 to store and manage data, such as for example, files, on one or more writable storage device media, such as magnetic disks, video tape, optical, DVD, magnetic tape, and any other similar media adapted to store information, including data and parity information. However, as illustratively described herein, the information is preferably stored on the disk 214. The disk 214 within a volume are typically organized as one or more groups of Redundant Array of Independent (or Inexpensive) Disks (RAID).

As used herein, the word "file" encompasses a container, an object, or any other storage entity. Interaction between nodes 208, 210, 212 and storage system 204 can enable the provision of storage services. That is, nodes 208, 210, 212 may request the services of the storage system 204, and the storage system 204 may return the results of the services requested by the nodes 208, 210, 212, by exchanging packets over the connection system 206. The nodes 208, 210, 212 of the cluster system 202 may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the nodes 208, 210, 212 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Storage system 204 is coupled to nodes 208, 210, 212 over the connection system 206.

Storage system 204 can be connected to a user console 218, such as a monitor with a keyboard. A user can provision storage space on disks via user console 218. To provision storage space, a user takes into consideration various factors, such as a schedule according to which data will be backed up on disk(s) 214, the retention plan (i.e., how long the data is going to be maintained), whether the data is going to be mirrored, and how often the data on disk(s) is going to change.

Storage System 204

Figure 3:
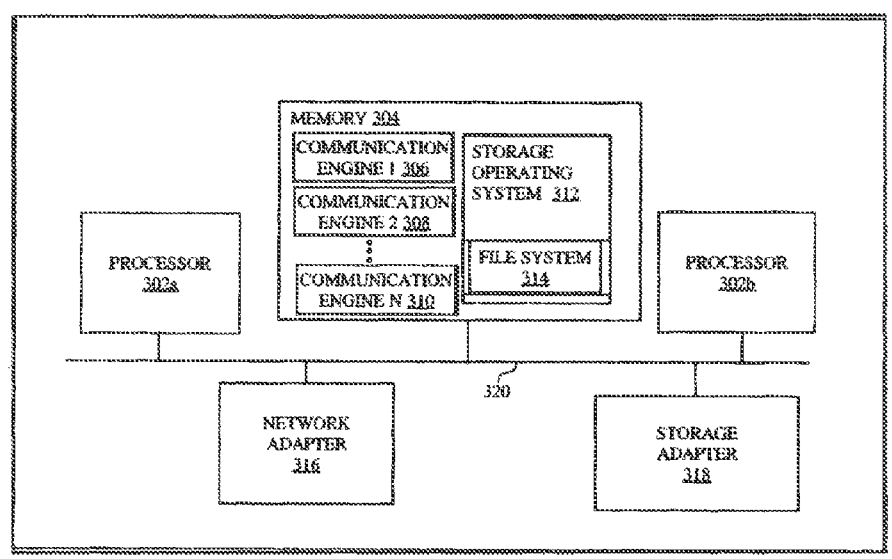
FIG. 3 is a diagram showing architecture of the storage system shown in FIG. 2 according to an embodiment of the present invention.

FIG. 3 is a diagram illustrating various components of the storage system 204, in accordance with an embodiment of the invention. Specifically, the storage system 204 comprises a plurality of processors 302a, b, a memory 304, a network adapter 316, and a storage adapter 318 interconnected by a system bus 320. Storage system 204 executes a storage operating system 312 that preferably implements a high-level module, such as a file system 314, to logically organize the information as a hierarchical structure of named directories, files and special types of files called virtual disks (hereinafter generally "blocks") on the disks.

The memory 304 comprises storage locations that are addressable by the processors and adapters for storing software program code and data structures associated with the present invention. The processors 302a, b and adapters may, in turn, comprise processing elements and/or logic circuitry configured to execute the software code and manipulate various data structures.

Storage operating system 312, portions of which are typically resident in memory 304 and executed by the processing elements, functionally organizes the storage system 204 by, invoking storage operations in support of the storage service implemented by the storage system 204. It will be apparent to those skilled in the art that other processing and memory means, including various computer readable media, may be used for storing and executing program instructions pertaining to the invention described herein. As illustrated herein, storage operating system 312 is preferably the NetApp® Data ONTAP® operating system available from Network Appliance Inc., of Sunnyvale, Calif., that implements a Write Anywhere File Layout (WAFL™) file system. However, it is expressly contemplated that any appropriate storage operating system may be enhanced for use in accordance with the inventive principles described herein to facilitate access to disks. As used herein, the term "storage operating system" generally refers to the computer-executable code operable on a computer that manages data access.

The file system 314 "virtualizes" the storage space provided by the disks. The file system 314 logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

Figure 4A:
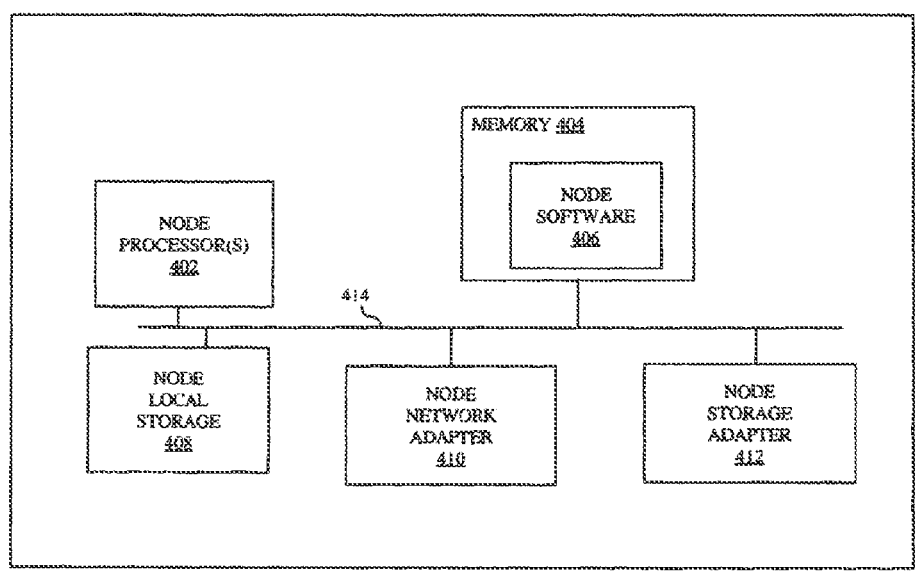
FIG. 4A is a block diagram illustrating various components of a node shown in FIG. 2 according to an embodiment of the present invention.
Figure 4B:
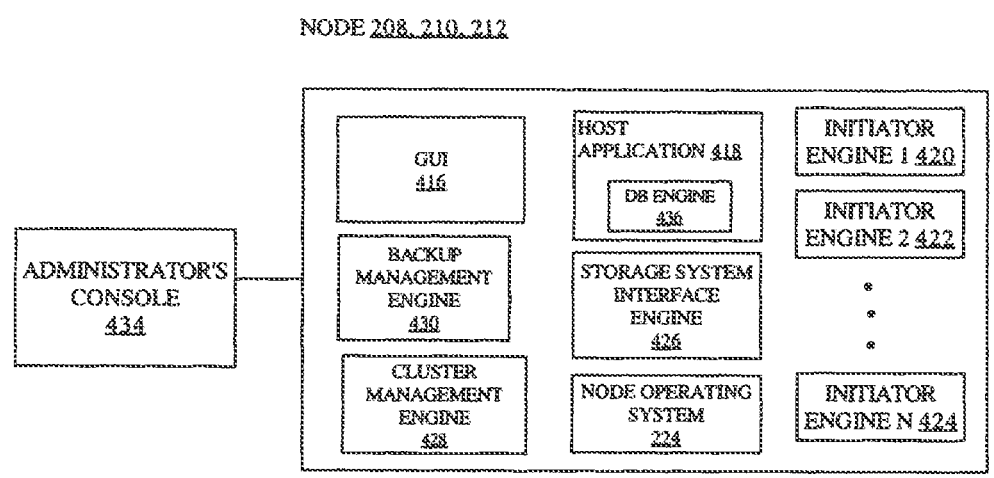
FIG. 4B is a block diagram illustrating various software components executed at the node shown in FIG. 1 according to an embodiment of the present invention

Communication engines 306, 308, 310 are configured to communicate with initiator engines 420, 422, 424 of nodes 208, 210, 212 (these nodes are shown in FIG. 4b and will be described in greater detail with reference to FIG. 4b). Communication engines 306, 308, 310 are configured to execute an operation request initiated by a client and sent to an active node. As will be described, the active node storage system interface engine receives the request and transmits the request to an active node initiator engine 420, 422, 424. The active node initiator engine sends the request to one of the plurality of communication engines 306, 308, 310. Upon execution of the request by the storage system, the communication engine communicates the status of the operation execution to the initiator engine of the node that sent the request.

The network adapter 316 comprises a plurality of ports adapted to couple storage system 204 to one or more nodes 208, 210, 212 over point-to-point links, wide area networks, virtual private networks implemented over a public network (Internet) or a shared local area network. The network adapter 316 thus may comprise mechanical, electrical and signaling circuitry.

The storage adapter 318 cooperates with the storage operating system 312 to access information requested by nodes 208, 210, 212. The storage adapter 318 comprises a plurality of ports having input/output (I/O) interface circuitry that couples to the disks over an I/O interconnect arrangement, such as a conventional high-performance, FC link topology.

Nodes 208, 210, 212

Referring now to FIG. 4A, each of nodes 208, 210, 212 comprises a node processor(s) 402, node memory 404, a node network adapter 410, a node storage adapter 412, and a local storage 408 coupled by a bus 414.

The node processors 402 are the central processing units (CPUs) of the nodes 208, 210, 212 and, thus, control the overall operation of the nodes 208, 210, 212. In certain embodiments, the node processors 402 accomplish this by executing software, such as that described in more detail herein. Node processors 402 may include one or more programmable general-purpose or special-purpose microprocessors, digital signal processors (DSPs), programmable controllers, application specific integrated circuits (ASICs), programmable logic devices (PLDs), or the like, or a combination of such devices.

Node memory 404 comprises storage locations that are addressable by the processor 402 and adapters (a node network adapter 410 and a node storage adapter 412) for storing software program code, such as node software 406 and data structures associated with the present invention. The node processor 402 and node adapters may, in turn, comprise processing elements and/or logic circuitry configured to execute the software code and manipulate various data structures. Node memory 404 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The node network adapter 410 comprises a plurality of ports adapted to couple the nodes 208, 210, 212 to one or more clients 216 (shown in FIG. 2) over point-to-point links, wide area networks, virtual private networks implemented over a public network (Internet) or a shared local area network. The node network adapter 410 thus may comprise the mechanical, electrical and signaling circuitry needed to connect the node to the network.

The node storage adapter 412 cooperates with the node operating system 224 (shown in FIG. 4a) executing on the nodes 208, 210, 212 to access data from disk 214 The node storage adapter 412 comprises a plurality of ports having input/output (I/O) interface circuitry that couples to the disk 214 over an I/O interconnect arrangement, such as a conventional high-performance, fibre channel (FC) link topology.

Node local storage 408 is a device that stores information within nodes 208, 210, 212, such as node software 406, node operating system 224, and data. Each node 208, 210, 212 loads node software 406 into node memory 404 from which they are accessed by node processors 402.

Referring now to FIG. 4B, according to embodiments of the present invention, nodes 208, 210, 212 execute the following software: a client application(s) 418, a backup management engine 430, a user interface engine 416, a storage system interface engine 426, the node operating system 224, a cluster management engine 428 and a plurality of initiator engines 420, 422, 424. In one embodiment, engines are implemented as modules. As used herein, the term "module" refers to computer program code adapted to provide the functionality attributed to the module upon execution by a processor. Client application(s) 418 can be, for example, Microsoft Exchange Server and Microsoft SQL Server, although the present invention contemplates that other client applications can be executed at nodes 208, 210, 212. In the case of Microsoft Exchange Server, electronic messages are received from clients 216 by Microsoft Exchange Server and are passed to a database (DB) engine 436. DB Engine 436, in turn, stores the messages on disk 214 as files.

In Microsoft Exchange Server, a storage group (SG) is a unit for storing data. Each storage group may include a database file and a transaction log, which describes changes made to the database file. Backup management engine 430 causes the storage system 204 to back up storage groups using, for example, snapshot capability. The process of creating snapshots is described in U.S. patent application Ser. No. 10/090, 963, entitled "System and Method for Creating a Point-in-time Restoration of Database File," by Dennis Chapman, the contents of which are incorporated by reference herein. A snapshot is a persistent point in time (PPT) image of an active file system that enables quick recovery of data after data has been corrupted, lost, or altered. An "active file system" is a file system to which data can be both written and read.

Backup management engine 430 also causes storage system 204 to create snapinfo files that are stored on disk(s) 214. A snapinfo file may include information about a particular snapshot. This information may be, for example, a timestamp when a particular snapshot was taken and location where the snapshot is stored on disk(s) 214. A backup dataset includes one or more snapshots of application data. A backup dataset may further include a transaction log of changes to the application data and one or more snapinfo files describing a backup dataset.

As described herein in reference to FIG. 3, after backup management engine 430 initiates creation of snapshots by sending a command to storage system 204 via storage system user interface engine 426, storage operating system 312 of storage system 204 (shown in FIG. 3) creates snapshots and snapinfo files. Storage operating system 312 reports back to backup management engine 430 when the operation is completed. Storage system interface engine 426 is configured to act as an interface between nodes 208, 210, 212 and storage system 204. Engine 426 communicates with storage system 204 using an application programming interface (API), for example, Zephyr Application and Programming Interface (ZAPI) protocol. An API is a source code interface that a computer system or program library provides in order to support requests for services to be made of it by a computer program. In one implementation, engine 426 is a SnapDrive® for Windows, a product provided by Network Appliance, Inc., of Sunnyvale, Calif.

Storage system interface engine 426 may provide optimum storage management for file systems and filer volumes. Examples of filer volumes include NetApp® filer volumes and Snapshot™ backup and restore operations, both available from Network Appliance™ of Sunnyvale, Calif. Storage system 204 may also be suitable for implementation with additional storage managers supporting Snapshot™ backups such as NetApp SnapManager® for Microsoft® Exchange. Additionally, storage system supports the iSCSI and Fibre Channel (FCP) protocols. However, storage system interface engine 426 may be independent of underlying storage access media and protocol and may be capable of accessing virtual disks of iSCSI and FCP on one or more file systems simultaneously.

Storage system interface engine 426 may also provide a file system extension feature to a client application that may be utilized to automatically increase file system capacity for managed clients when utilization reaches a specified level. This function allows for the provisioning of logical unit numbers (LUNs) when there is not enough space available in a volume group to extend a file system. In computer storage, a LUN is an address for identifying an individual disk drive and by extension, the disk device itself. Logical unit numbering may be utilized to define SCSI devices on a single SCSI bus and identify SCSI devices so the client may address and access the data on each disk drive in an array. Logical units may directly correspond to a volume drive (for example, C: may be a logical unit). LUN may be a three-bit identifier for a logical unit. A LUN may also be referred to as a virtual disk, which may be defined as a group of hard disks bound together at the controller level and presented to the operating system as a single disk. Virtual disks are externally addressable within a target that implements the functions of a device module (e.g., part of a node on a SCSI bus). The LUN is the second level of SCSI addressing, where the "target" is level one and the "tag" is level three. Typically there are pluralities of SCSI disks drives on a single SCSI interface connect.

Provisioning storage in a cluster system refers to allocating physical memory for a specific application or client. One way a storage system interface engine 426 provisions storage resources is by making available resources, such as LUNs available to the application or client. When provisioning resources throughout the storage system, the storage system interface engine 426 specifies certain parameters for each LUN. These parameters may include the, the storage pool, the connectivity between the client and the, and the RAID type of the storage pool. Additionally, the parameters for newly provisioned LUNs may be client-specific, as each client may require or perform best using a certain size, type, or otherwise distinct LUN structure. When the physical memory allocated to a specific file system is substantially exhausted because of the amount of data stored within the file system, the storage system interface engine 426 may provision one or more LUNs to extend the file system. When storage system interface engine 426 provisions a LUN for a file system, the storage system interface engine 426 creates and/or allocates additional storage within a storage pool. Preferably, the provisioned LUN is from the same storage pool as other LUNs allocated to the same file system. Alternately, the provisioned LUN may be from a different storage pool on the same server. In a further embodiment, the provisioned LUN maybe from a different storage pool on a different server.

The storage system interface engine 426 may create new LUNs prior to assigning them to a specific client. To make a LUN available to a client application, a storage system interface engine 426 of an active node executes, for instance a connect command to one of plurality of initiator engines 420, 422, 424, for instance initiator engine 420.

Nodes 208, 210, 212 may each further execute the initiator engines 420, 422, 424. Initiator engines 420, 422, 424 are configured to communicate with the storage system interface engine 426 and the communication engines 306, 308, 310 located on the storage system 204. Communication between initiator engines 420, 422, 424 and communication engines 306, 308, 310 provides LUN creation and mapping for active and passive nodes of the cluster system 202. To this end, storage system interface engine 426 sends a command(s) to an initiator engine, for example, initiator engine 420, which, in turn, passes the command to, for example, communication engine 306.

Nodes 208, 210, 212 may be connected to a system administrator's console 434 through which a system administrator can configure various settings such as thresholds to define the bounds of resource utilization, for example, a maximum amount of disk space allowed, connection time thresholds, virtual memory thresholds, and the like that effect execution of the operation request GUI engine 416 provides a user interface to a system administrator at console 434. A system administrator can modify the settings via console 434.

In addition, the system administrator performs migration of files to storage system 204 using backup management engine 430, and GUI engine 416, which are components of SnapManager™ for Microsoft® Exchange and SnapManager™ for Microsoft® SQL Server. To this end, the system administrator physically copies the files from nodes 208, 210, 212 to storage system 204. Location of the files (such as a directory path and a volume(s) on which the files reside) is stored in node memory 404.

Nodes 208, 210, 212 further execute the node operating system 224. Node operating system 224 is a program that is, after being initially loaded into node memory 404, manages client applications (such as client application 418) executed on nodes 208, 210, 212. The node operating system 224 can be, for example, UNIX®, Windows NT®, Linux®, or any other general-purpose operating system.

Node 208, 210, 212 may comprise a cluster management engine 428. A cluster management engine 428 may be a collection of software on each node that operates clusters and configures and manages cluster-related activity. The cluster management engine 428 sees all resources as identical objects. Resources may include physical hardware devices, such as disk drives and network cards, or logical items, such as logical disk volumes, TCP/IP addresses, entire applications and databases, among other examples. A group is a collection of resources to be managed as a single unit. Generally, a group contains all of the components that are necessary for running a specific application and allowing a user to connect to the service provided by the application. Operations performed on a group typically affect all resources contained within that group.

Cluster management engine 428 prevents a passive node from unauthorized access to a resource group. It is contemplated that only one node of a cluster system 202 may own a cluster resource. This node is referred to generally as an active node. For the purposes of this application, any one of nodes 208, 210, 212 may be an active node with respect to resource ownership. Furthermore, any one of nodes 208, 210, 212 that is not the active node with respect to the resource group may be a passive or non-owner node with respect to the resource group.

Examples of a cluster management engine 428 include, but are not limited to, Microsoft Cluster Server (MSCS), designed by Microsoft® Corporation of Redmond, Wash. for clustering for its Windows NT 4.0 and Windows 2000 Advanced Server operating systems, Novell® Netware Cluster Services (NWCS), and Veritas Clustering Server. Each of these clustering technologies each have their own way to configure, manage, and operate clusters. However, any cluster management engine may be suitable for integration with a system 200 in accordance with the exemplary embodiments of the present invention by configuring operation instructions to the respective cluster management engine.

Figure 5:
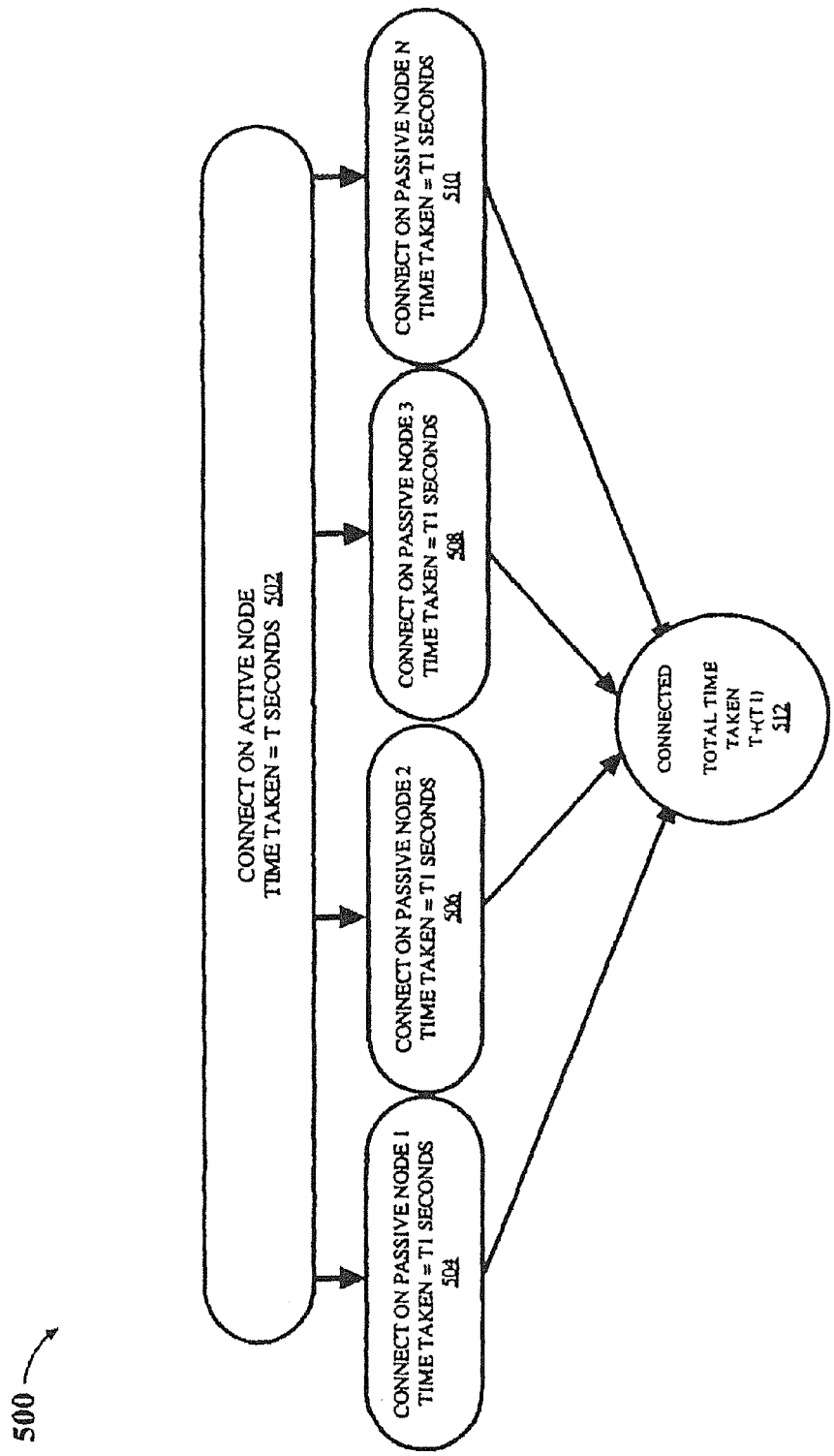
FIG. 5 is a flow diagram illustrating operation execution in a system according to an embodiment of the present invention.

Referring now to FIG. 5, a flow diagram illustrating a process 500 for executing an operation in a system according to an embodiment of the present invention is shown. Process 500 may be implemented in a system such as system 200 described above and in FIG. 2. In one embodiment, process 500 may comprise performing an operation such as a LUN connect or disconnect operation on an active node of a cluster 502. Performing the LUN connect or disconnect operation on the active node may require T seconds. Process 500 may further comprise performing a LUN connect or disconnect operation on each passive node in the cluster in parallel 504-510. In this manner, the total time required to connect or disconnect on both the active node and passive nodes of the cluster may be defined by the equation:

$$t = T + T1$$

512, where T1 is the time required to perform the connect or disconnect operation on each of the plurality of passive nodes.

It is contemplated that not all passive nodes may perform an operation as requested by an active node simultaneously. Therefore, process 500 may be expanded such that the total time taken t is the representation of the time required to connect on the active node T plus the time required to connect on the passive node requiring the greatest connection time, such that total connectivity time may be defined by the equation:

$$t = T + Tn$$

where n is the passive node requiring the greatest connection time. It is further contemplated that the operation to be performed may be any suitable operation initiated by the active node cluster. For instance, operation may be a create or delete operation, or a like operation.

LUN Creation and Mapping

Figure 6:
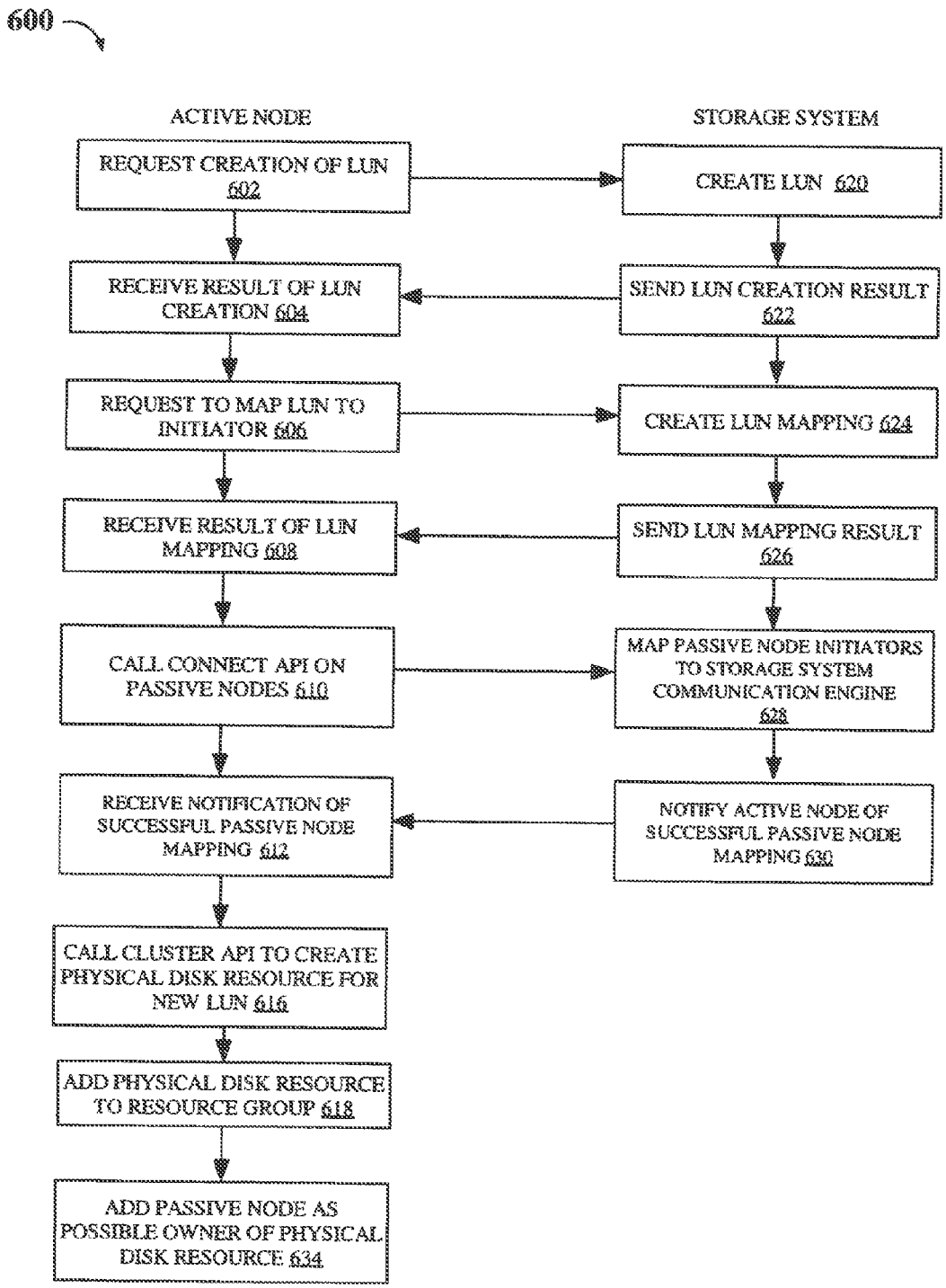
FIG. 6 is a flow diagram of a process for providing a cluster operation performance improvement according to an embodiment of the present invention.

Referring to FIG. 6, a flow diagram illustrating the steps 600 to execute an operation on a plurality of cluster nodes simultaneously as illustrated in FIG. 5 is shown. Steps 600 may be initiated by a storage system interface engine 426 of an active node of a system 200 such as has been described in detail above and shown in FIGS. 2-4. Specifically, any one of the nodes of the system may be an active node with respect to a resource group suitable for receiving an operation request and initiating the steps described herein. In one embodiment, an active node requests creation of LUN (at step 602). The request may be initiated by a user, by a client application, or by any other entity. Upon receiving request from user for creating a LUN, storage system user interface engine 426 of the active node calls an application programming interface (API) on the storage system 204 to request creation of the LUN. Specifically, a LUN creation request initiated by the storage system interface engine 426 of the active node may be communicated to an initiator engine of the active node. Initiator engine passes all required parameters such as LUN Path, LUN size, LUN type etc., to a communication engine of the storage system 204.

In response to a LUN creation request, the storage system creates the LUN (at step 620) and communicates the result of the operation at step 622 to the initiator engine of the active node, which in turn communicates the result to the storage system interface engine 426. The result may be in the form of a return value of the API, and the active node may receive the result at step 604. This step may include the step for establishing a session/connection between a communication engine at the storage system and an initiator engine at the active node. If there is no session already established between a storage system communication engine and a node initiator engine, storage system interface engine 426 can request corresponding initiator engine for creation of a session.

After creation of a LUN, LUN may be mapped to the node initiator of the active node by sending a LUN mapping request to the storage system 606. For instance, once the storage system interface engine 426 receives the success result for LUN creation, the storage system interface engine 426 of the active node communicates an API on the storage system requesting to map the LUN to the specified initiator(s) on the node. In response to the mapping request, storage system 204 creates LUN mappings at step 624 and reports the result of the operation to the storage system interface of the active node at step 626. The result may be a return value of the API call.

In addition, storage system communication engine 426 notifies the node initiator engine of the addition of the new disk. Active node initiator engine notifies the operating system (OS) 224 and OS 224 sends a notification of the new disk arrival to the node storage system interface engine 426. In an embodiment compatible with a Windows® operating system, storage system interface engine 426 formats the disk as a Windows® disk with the NTFS file system. However, it is contemplated that the system may be compatible with any operating system, and may be suitable for formatting the disk as a usable media for the operating system. Active node storage system interface engine 426 may subscribe to these OS events during the startup of storage system interface engine service.

Connect on Passive Nodes

Once the active node storage system interface engine receives a notification, such as a "New Disk Arrival" notification on the active node, i.e., where a user initiated LUN Create operation, the storage system interface engine simultaneously calls a connect API on the other storage system interface engine instances running on the passive nodes of the cluster system (step 610). As described herein, connect API may utilize a ZAPI protocol API. Similar to performing a connect operation on the active node, connect operation on a passive node comprises of mapping a passive node initiator engine to the storage system communication engine (step 628). Passive node initiator engine mapping provides a passive node access to the LUN in the instance of failover. Cluster management engine 428 may prevent a passive node from accessing the LUN in instances other than failover. The storage system 204 maintains a list of initiators, including any passive node initiators, mapped to the LUN. If a passive node initiator is not mapped to the LUN, storage system 204 does not allow the passive node to access the LUN. Connect operation on passive node further comprises adding a passive node as a "possible owner" of the resource. Cluster maintains the list of passive nodes available for failover. In this manner, failover of the LUN's resource to a passive node is facilitated in the instance of an active node failure. Storage system communication module may then notify the active node initiator module of successful passive node mappings (step 630). Active node initiator module may receive notification of successful passive node mapping (step 612) and communicate successful passive node mapping notification to active node storage system interface engine. Storage system interface engine may also create new resource in cluster for the newly created LUN. Storage system interface of the active node may also add successfully mapped passive nodes as possible owners of the new resource 634.

Create Cluster Resource

Active node may performs steps to create a new resource for a physical disk. For instance, on successful completion of connect operation on all nodes, active node performs the following steps. Active node calls a cluster API to create a physical disk resource for the created and mapped LUN (step 616). If a user specified a new resource group, active node storage system interface requests the cluster API to create a new resource with the specified resource group. The newly created physical disk resource is then added to the resource group (step 618).

Storage system interface engine of a node may present the result of the operation execution to a client application. Disk appears as a local disk to the client applications and users. To this end, nodes may support a variety of operating systems, including Windows, Solaris™, HP-UX, AIX, Red Hat Enterprise Linux or any other operating system suitable for presenting a storage resource to a client.

System 200 may improve cluster failover performance when an active node has failed. In one embodiment, system 200 may be implemented with a cluster management engine utilizing a "shared nothing" architectural model, where each node (server) has ownership of specific storage resources located on a shared-storage bus (SCSI, FCP or SSA) except in times of failover. During the failover, storage resources are transferred in ownership (via SCSI lock/release commands) from the active node, which has failed, to a passive node. The passive node may comprise multiple instances of applications designated for failover. Failover occurs when an active node cannot respond to read or write commands. Failover can also be initiated by using cluster management engine's CLI/API or Cluster Administrator utility provided by Microsoft Corporation of Redmond, Wash. During failover, cluster management engine initiates transfer of storage resource ownership, along with all the other resources (if any) contained in a failover group. A surviving node, after this transfer and subsequent start-up of its copies of the failed application or service, then resumes operations that were interrupted at the time of the failover, e.g., file and print sharing, web services, database transactions and queries (via roll-back restart to the last "committed" transaction). The surviving node also takes ownership of a quorum resource, a special disk or volume that contains the cluster database. This mode of operation may continue until such time as the failed node is revived and brought back on line.

Figure 7:
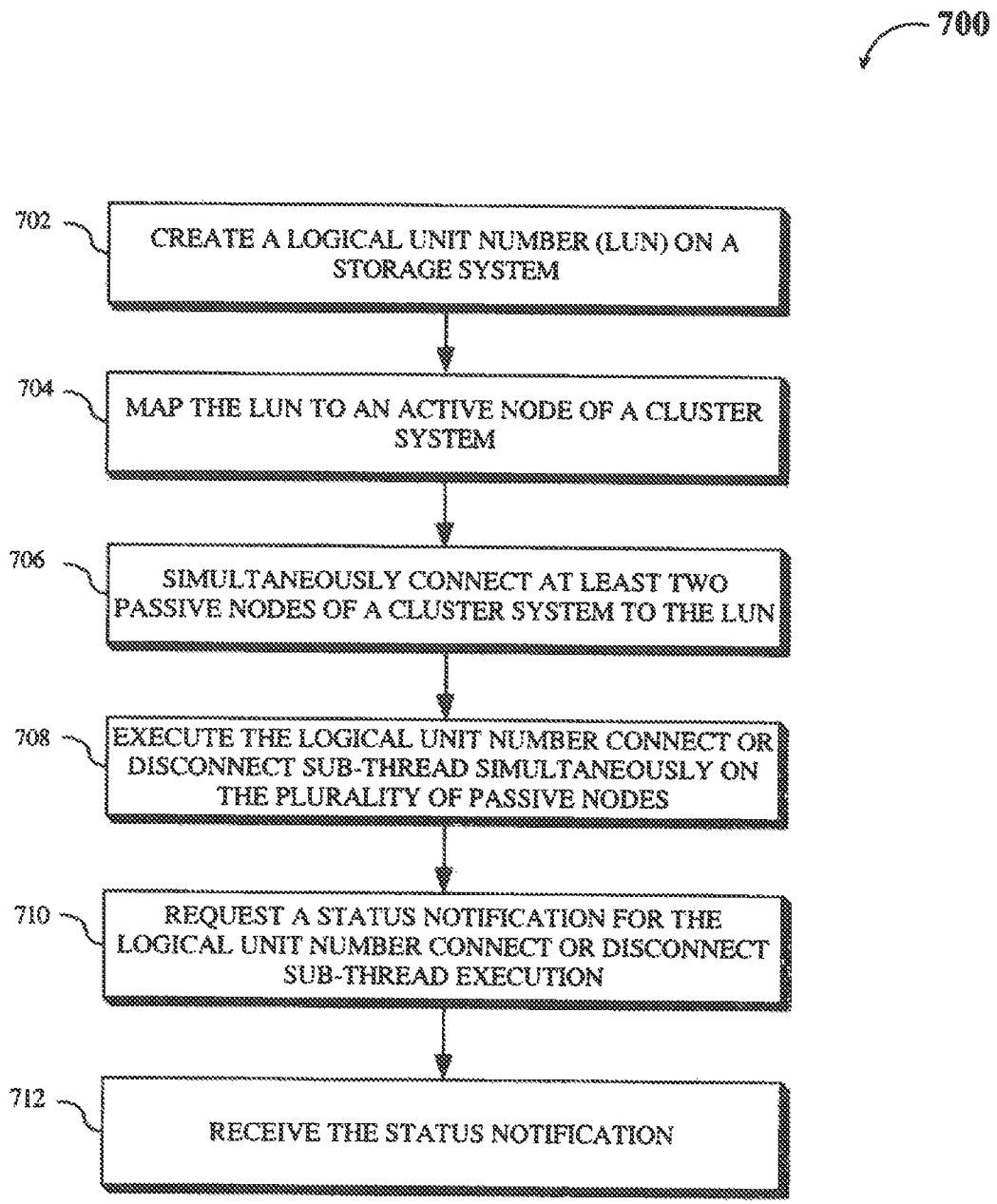
FIG. 7 is a flow diagram of steps performed to execute the cluster operation performance improvement according to an embodiment of the present invention.

Referring now to FIG. 7, a flow diagram of a process 700 for providing performance operation initiation in accordance with exemplary embodiments of the present invention is shown. Process may comprise creating a LUN on a storage system (step 702). An operation for creating a LUN on a storage system may be initiated on an active node of a cluster. On cluster nodes, creation of LUN may include the following steps: Creating LUN on storage system from active node and connecting the created LUN to all the passive nodes, Similarly, a LUN connect or disconnect can also be initiated on active node of a cluster. LUN create, connect or disconnect initiation may be implemented by a storage system interface engine, which may create a thread comprising instructions suitable for performing the create, connect or disconnect operation. Process 700 may comprise mapping the LUN to a node (step 704), such as an active node. Process 700 may further comprise simultaneously connecting at least two passive nodes to the LUN (step 706). Simultaneously connecting passive nodes to LUN may comprise mapping the passive node initiator engines to a communication engine of the storage system and adding each of the plurality of passive nodes as a possible owner of a resource group. To map the plurality of passive nodes to the storage system, a sub-thread or worker thread may be created for each of the plurality of passive nodes in the cluster. Each sub-thread may execute simultaneously on each of the plurality of passive nodes in the cluster. Parallel execution may be accomplished by simultaneously creating a separate sub-thread for each of the plurality of passive nodes from the main thread created to perform an operation on the active node of the cluster. Process 700 may initiate a remote call from a sub-thread to a passive node associated with the respective sub-thread to perform the required operation on the passive node. Process 700 may then request passive node notification of an operation status (step 708). For example, the passive node may indicate the status of the connect or disconnect operation on the node. The status may be a successful/unsuccessful connect or disconnect notification. Process may comprise receiving the status notification 710 and report the status to a client application (step 712). Prior to reporting the status to a client application, process 700 may inspect the status reported by the individual passive nodes. Process 700 may also allow for multiple tasks to be performed on a parallel basis. It is also multi-threaded in design to allow multiple operations to be processed simultaneously.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for providing improved cluster operation performance, the system comprising:
a storage system; and
a cluster system communicatively coupled to the storage system comprising an active node and a plurality of passive nodes, wherein the active node comprises a storage system interface engine and at least one initiator engine and each of the plurality of passive nodes comprises a storage system interface engine and at least one initiator engine, the storage system interface engine of the active node is configured to generate an operation thread for each of the plurality of passive nodes, and simultaneously execute the operation thread for each of the plurality of passive nodes to communicate an operation request from each of the plurality of passive nodes of the cluster system to the storage system.

2. The system of claim 1, wherein the active node is an active server suitable for managing a resource group and each of the plurality of passive nodes are suitable for managing the resource group in the event of a failover.

3. The system of claim 1, wherein the storage system further comprises at least one communication engine suitable for communicating with the at least one initiator engine of the active node and the at least one initiator engine of each of the plurality of passive nodes.

4. The system of claim 3, wherein the active node storage system interface engine is configured to communicate an operation execution request to the active node initiator engine.

5. The system of claim 1, wherein the active node storage system interface engine receives notification from the storage system upon execution of the operation.

6. The system of claim 1, wherein the active node storage system interface engine is configured to simultaneously call an application programming interface on each of the plurality of passive nodes to request mapping of each of the plurality of passive node initiators to the storage system.

7. The system of claim 1, wherein the storage system interface engine is configured add a passive node as a possible owner of a resource.

8. A method for providing improved cluster operation performance, the method comprising:
requesting an operation execution on an active node;
receiving the operation execution request on the active node of the cluster system; creating a plurality of operation threads for a plurality of passive nodes in the cluster system, each particular operation thread corresponds to a particular node of the plurality of passive nodes, each particular operation thread configured for communicating the operation request to the particular node; and simultaneously executing at least two of the plurality of operation threads to communicate the operation request from at least two of the plurality of passive nodes of the cluster system to a storage system.

9. The method of claim 8, wherein the active node is an active server suitable for managing a resource group and each of the plurality of passive nodes are suitable for managing the resource group in the event of a failover.

10. The method of claim 8, wherein the operation is a connect operation.

11. The method of claim 8, wherein the operation is a disconnect operation.

12. The method of claim 8, further comprising receiving a notification regarding execution of each of the plurality of operation threads.

13. The method of claim 12, wherein the notification is a successful or unsuccessful connect or disconnect notification.

14. The method of claim 13, further comprising inspecting the notification prior to reporting a status to a client application.

15. The method of claim 8, further comprising reporting a status to a client application.

16. A non-transitory machine readable medium having stored thereon instructions for performing a method for providing a cluster system performance improvement in a cluster system having at least one active node and a plurality of passive nodes, comprising machine executable code, which when executed by at least one machine, causes the machine to:

receive an operation execution request on the at least one active node;

create a plurality of operation threads for the plurality of passive nodes, each particular operation thread corresponds to a particular node of the plurality of passive nodes, each particular operation thread configured for communicating the operation request to the particular node; and simultaneously execute at least two of the plurality of operation threads to communicate the operation request from at least two of the plurality of passive nodes of the cluster system to a storage system.

17. The storage medium of claim 16, wherein the operation is at least one of a connect operation or a disconnect operation.

18. The storage medium of claim 17, wherein the computer program code is further adapted to receive a notification regarding execution of each of the plurality of operation threads.

19. The storage medium of claim 18, wherein the computer program code is further adapted to report a status to a client application.

20. The storage medium of claim 19, wherein the computer program code is further adapted to inspect the notification prior to reporting the status to the client application.

* * * * *